United States Patent

Steinlein

[15] 3,657,703

[45] Apr. 18, 1972

[54] CODE-RESPONSIVE CONTROL RECEIVER

[72] Inventor: Hans-Wolfgang Steinlein, Nurnberg, Germany

[73] Assignee: Siemens Aktiengesellschaft, Berlin, Germany

[22] Filed: Mar. 10, 1971

[21] Appl. No.: 122,828

[30] Foreign Application Priority Data

Mar. 12, 1970 Germany ....................P 20 11 672.7

[52] U.S. Cl. ....................340/167 R, 340/147 B, 340/164 A

[51] Int. Cl. ....................H04q 9/00

[58] Field of Search ....................340/147 B, 164, 164 A, 167, 340/171

[56] References Cited

UNITED STATES PATENTS 3,320,501 5/1967 Davies ....................340/167 X

*Primary Examiner*—Donald J. Yusko

*Attorney*—Curt M. Avery, Arthur E. Wilfond, Herbert L. Lerner and Daniel J. Tick

[57] ABSTRACT

A code-responsive control receiver for response to preselectable code combinations, which operates on the pulse interval principle and has a synchronous selector and switching device for connecting a command relay to the pulse receiving circuit. The receiver is provided with a receiver relay responsive to the arriving preselector pulses and control pulses. A transistor flip flop circuit is connected to a direct voltage supply. The transistors of the flip flop cooperate with the switching members and through further flip flop circuitry upon two differential coils of the command relay so that the system operates to selectively activate particular loads or load groups in accordance with the preselected code pulse combination.

5 Claims, 1 Drawing Figure

Patented April 18, 1972 3,657,703
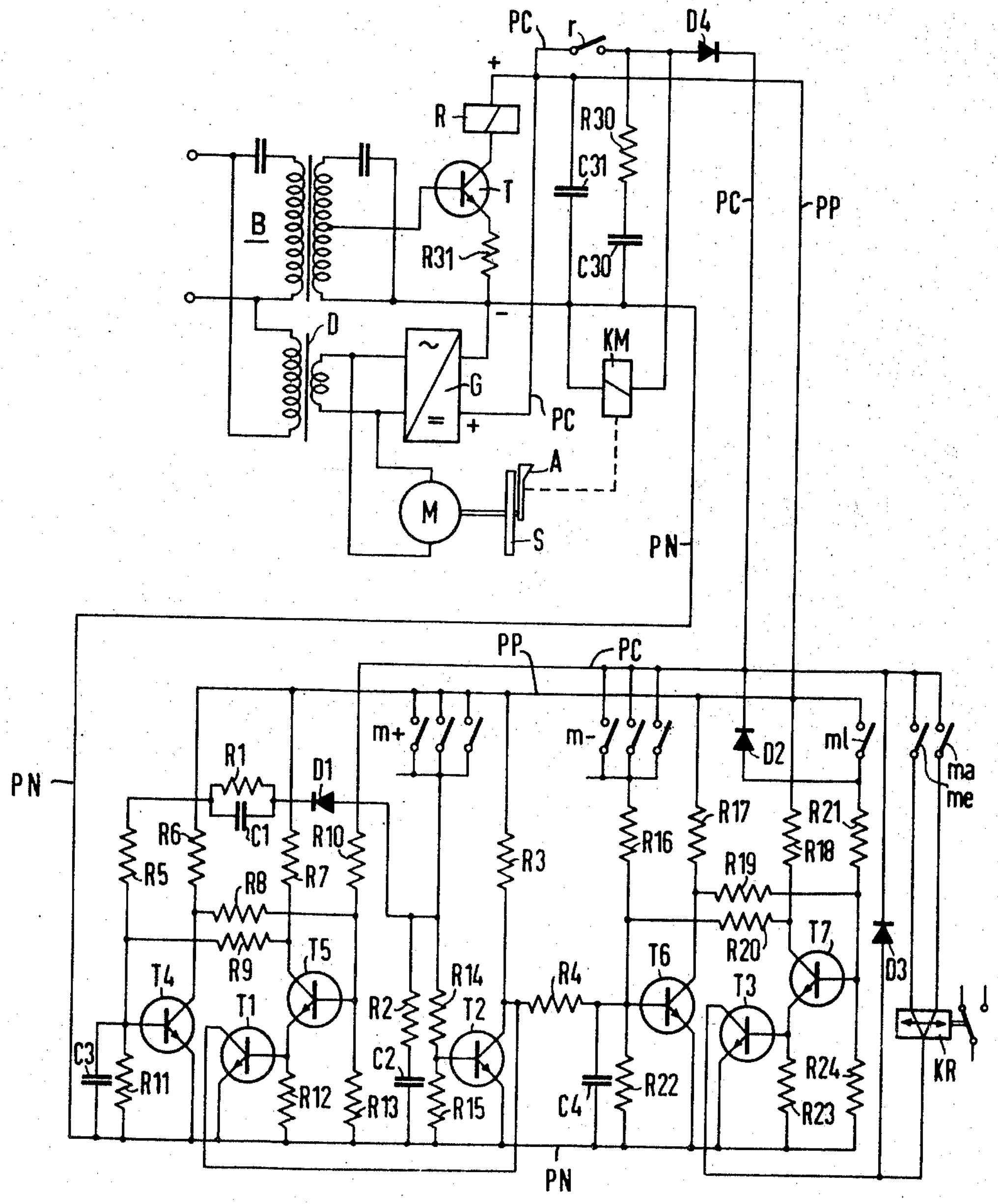

CODE-RESPONSIVE CONTROL RECEIVER

My invention relates to a control receiver responsive to preselected code combinations which operates on the pulse interval principle and in which one or more polarized command relays are connectable to a pulse circuit by means of contact members actuated by a synchronous selector, and in which a pulse sequence of active and passive preselection pulses effects the preselection of a code combination. Such a receiver further comprises a receiver relay in which a normally open or make contact, also called a "closer," is connected in a pulse circuit to operate in the rhythm of the preselection and control pulses received.

A receiver of the aforedescribed general type has become known from a publication of Landis & Gyr issued in Sept., 1967. In this receiving system the first eight switching steps of the synchronous selector are coordinated to respective feeler levers which are deflected by a dog of a rotating member and which are latched in the deflected position when during the deflection there arrives a preselector pulse or active pulse of a control signal. If no pulse arrives (passive pulse), the particular feeler lever drops back into its starting position. In this manner, a preselection pulse combination arriving at the code responsive receiver is stored and, at the end of the first eight switching steps of the synchronous selector, is compared with a code combination adjusted on a feeler arm designed as a mechanical matrix. When the arriving combination and the adjusted combination coincide, the feeler arm effects an actuation of a selector switch which connects the pulse circuit with contact members that actuate the command relay. When the arriving and the adjusted combination differ from each other, the selector switch is not actuated and the command relay cannot be switched on. To avoid faulty switching of the receiver, care must be taken that the comparison between the adjusted and arriving pulse combination is free of errors. For that reason, the individual mechanical matrices consisting of individual sliders of which each has a recess, and the sliders, must in any particular position be secured from inadvertent displacement. Producing such a matrix requires a high degree of precision and the adjusting of the desired combination is dependent upon great care. Furthermore, the matrix and the latching devices occupy relatively much space.

Since power supplying utilities progressively change over to have individual load groups discriminatingly switched on or off, correspondingly more preselection combinations of code pulses are needed. In the known code-responsive control receiver, only a limited number of preselector combinations is possible depending upon the number of feeler levers, so that an appreciable limitation is imposed upon the number of selectable loads or load groups which may be controlled with the aid of such a system.

It is an object of my invention, therefore, to devise a code-responsive control receiver with combination preselection of the aforedescribed general type, in which the adjusting of the desired code is considerably simplified and in which the number of possible codes available within the scope of the switching steps at the synchronous selector for effecting a preselection, may be readily increased.

Another object subsidiary to the foregoing is to obtain a compact design of the overall equipment.

According to the invention, I basically employ a code-responsive control receiver organization of the type of the prior art as aforedescribed, but provide additional circuitry, preferably entirely or predominantly of electronic components and modules, comprising a direct voltage source, and a second transistorized bistable flip flop stage. The transistors of the first flip flop stage coact with a group of parallel switching members, appertaining to the above-mentioned synchronous selector, and are also connected through the second flip flop stage with two differential coils of the command relay so that the system operates to selectively activate particular loads or load groups in accordance with the preselected code pulse combination.

According to a more specific feature of the invention, I provide the system with a diode and a capacitor to which a resistor is shunt-connected. The diode-capacitor circuit is serially connected to the base electrode of the second transistor of the first flip flop stage, and to one pole of the direct voltage source when the switching members are closed. I further connect a voltage divider between the switching members and the diode, on the one hand, and the other pole of the direct voltage source, on the other hand. An overlap transistor has its base connected to the voltage divider tap, a series resistor connecting the collector electrode of the overlap transistor to the first pole of the direct voltage source, whereas the emitter electrode is connected to the second pole. A switching transistor is connected to and controllable by the first transistor and connected in parallel to the emitter electrode of the overlap transistor. The second bistable flip flop stage comprises another first transistor, a quenching member connecting the control input of the latter transistor with the first pole of the source of the second transistor. The second flip flop stage is connectable to the pulse circuit through parallel ones of the passive-pulse related switching members and a transverse resistor connect the base of the latter second transistor with the respective collectors of the overlap and switching transistors. The two differential working coils of the command relay have in common a feeder lead connected to the other pole of the voltage source, and a blocking transistor is interposed in the common feeder lead and in controlled connection with the first transistor of the second flip flop stage.

It is another object of my invention to reliably avoid faulty switching operations due to contact interruptions that may occur as a result of bouncing of the contact members or when subjecting the code-responsive receiver to shock or vibration.

To accomplish this, and in accordance with a further feature of my invention, I connect in parallel relation with the aforementioned voltage divider a series connection of a resistor and a capacitor. The returning of the first bistable flip flop stage into the starting position is simply secured by connecting a blocking diode between the pulse circuit and the control input of the second flip flop stage which is connected through the quenching contact with the first pole of the direct voltage source. Any voltage peaks as may occur when the working coils of the command relay are switched off and which may affect the operation of the flip flop stages are kept away from the flip flop stages if a free-wheeling diode is connected in parallel with the working coils of the command relay.

The foregoing and further objects, advantages and features of my invention, said features being set forth with particularity in the claims annexed hereto, will be elucidated and described in conjunction with an embodiment of the invention illustrated by way of example in the accompanying drawing having a single FIGURE which shows a circuit diagram of a receiver system incorporating the aforedescribed features of my invention.

By means of a receiving portion which is not illustrated on the drawing, except for its output terminals TA and TB of a coderesponsive control receiver, a receiver relay R is switched on upon arrival of a preselector or control pulse and remains picked up for the duration of the pulse. The normally open contact or closer r of the relay R connects the pulse circuit in the rhythm of the received pulses to the positive pole of the direct voltage source which are represented on the drawing by busses PP and PN of a direct voltage source G.

In the pulse circuit and behind the contact r there is connected a coupling magnet KM which serves to couple a switching arm A with a synchronous selector disc S which continuously rotates and is driven by a synchronous motor M. A starting pulse transmitted to the receiving system at the beginning of a control operation causes the receiver relay R to respond with the effect that the pulse circuit, for the duration of the starting pulse, is connected through the contact r to the positive pole PP of the direct voltage source G. The coupling magnet KM responds and engages the switch arm A with the synchronous selector disc S which entrains the switching arm for one full rotation of the synchronous selector disc.

There is the possibility that the other circuit components connected to the same pulse circuit may be affected by negative voltage peaks occurring when the contact r is opened, such peaks being due to the inductivity of the coupling magnet KM. In order to avoid such excessive voltage peaks, a diode D4 is connected in the pulse circuit behind the connecting point of the coupling magnet. The diode then operates to keep such negative voltage peaks away from the other circuit components. Further connected to the pulse circuit is a quenching combination formed of a resistor R30 and a capacitor C30. The capacitor C31 serves for smoothing the rectified alternating voltage.

Connected behind the diode D4, seen from the contact *r*, is the control input of a first bistable flip flop stage which comprises resistors R5 to R13, a first transistor T4, a second transistor T5 and a capacitor C3. The other control input of this flip slop stage is connected to the positive pole PP of the direct voltage source G under control by parallel-connected contact members m+ coordinated to the active preselector pulses, and through a diode D1 and a capacitor C1 which is shunted by a parallel resistor R1.

It should be understood that "active" preselector pulses are meant to be the preselector pulses of a code which must arrive during the closing duration of the *m*+ contact members which correspond to the code. Accordingly, "passive" preselector pulses are those preselector pulses which must not arrive during the closing duration of the *m*− contact members arranged in accordance with a code.

A voltage divider composed of resistors R14 and R15 is connected through the *m*+ members to the positive pole PP of the direct voltage source G. Connected between the two resistors R14 and R15 is the base of an overlapping transistor T2 whose collector electrode is connected through a series resistor R3 to the positive pole and whose emitter electrode is directly connected to the negative pole PN of the source G. The collector-emitter path of a switching transistor T1 is connected in parallel with the collector-emitter path of the overlapping transistor T2. The base electrode of the transistor T1 is directly connected to the emitter of a second transistor T5 of the first flip flop stage.

The second bistable flip flop comprises resistors R16 to R24, another first transistor T6, and another second transistor T7 and a capacitor C4. The control input of the second flip flop stage, connected to the base electrode of the transistor T7, is connectible through a quenching contact member ml to the positive pole PP of the voltage source G. The anode of a blocking diode D2 is connected to the control input behind the quenching contact member ml. The cathode of the blocking diode D2 is connected to the pulse circuit PC.

The other control input of the flip flop stage leading to the base electrode of the transistor T6 may be connected to the pulse circuit PC through the parallel operating *m*− contact members coordinated to the passive preselector pulses. Furthermore, the base electrode of the transistor T6 is connected through a transverse resistor R4 with the collector electrodes of the overlapping transistor T2 and the switching transistor T1. The collector-emitter path of a blocking transistor T3 whose base electrode is directly connected to the emitter electrode of the transistor T7 is interposed in the feeder line PN leading from the working coils of the command relay KR to the voltage source G.

The other connecting terminal of each working coil can be selectively and individually connected through the ON and OFF contact members me and ma to the pulse circuit PC. An actuation of the command relay KR takes place during each control pulse arriving during the closing period of the ON or OFF switch contact member. A free-wheeling diode D3 connected in parallel with the working coils takes care to keep the negative voltage peaks occurring during the switching-off of the working coils away from the flip flop stages so that these peaks cannot affect these stages.

Each of the two flip flop stages has a defined starting stage into which they are brought by actuation of the quenching contact member ml after each rotation of the switching arm A. The closing of the quenching contact member connects one control input of the second bistable flip flop stage for a short interval of time to the positive pole of the voltage source G, whereby the first transistor T7 of said flip flop stage, and consequently also the blocking transistor T3, are fully turned on. The positive potential of the source G also reaches for a short interval of time the pulse circuit PC through the blocking diode D2 so that the first transistor T5 of the first bistable flip flop and the switching transistor T1 are also fully turned on. This state of the flip flop stages is also effective when the code-responsive receiver system, when starting its operation, is placed on voltage.

The operation of the system is as follows. As mentioned, the starting pulse occurring at the beginning of a control signal causes the coupling magnet KM to be actuated which has the effect of coupling the switching arm A to the synchronous selector disc S. During a rotation of the arm together with the synchronous selector disc, the arm A actuates first the *m*+ and the *m*− contact members which, in the range of the first switching steps, are arranged concentrically with the rotating selector disc S. A "switching step" is intended to mean the angular range traversed by each contact member relative to the synchronous selector disc. The *m*+ and *m*− contact members may be arranged, for forming a desired code, in the region of the synchronous disc S rotation assigned to the preselector combination in a corresponding sequence. The ON and OFF contact members, as well as the quenching contact member ml, are arranged in the remaining region of the synchronous selector disc.

When an *m*+ contact member is closed, the capacitor C1 becomes charged and the pulse produced by the load current causes the first flip flop stage to assume another switching condition, thereby closing the control transistor T1. Due to the closing of the *m*+ contact member, the base electrode of the overlap transistor T2, which is connected to the voltage divider R14, R15 has a higher potential and said transistor is fully turned on. This way the base electrode of the second transistor T6 of the second flip flop stage continues to be connected to the negative potential via the resistor R4, so that said flip flop stage remains in its output condition.

If a preselection pulse sequence is transmitted which corresponds to the code adjusted at the code responsive control receiver, a preselector pulse must arrive during the closing period of an *m*+ contact member. This preselector pulse reaches via the control input of the first bistable flip flop stage connected to the pulse circuit, the base electrode of the transistor T5, which becomes conductive as a result and turns on the switching transistor T1 fully. When the respective *m*+ contact member opens again, the overlap transistor T2 closes. However, since the switching transistor T1 has been fully turned on in the interim, the base electrode of the second transistor T6 of the second flip flop stage continues to be at negative potential, so that this flip flop stage remains in its output condition, in which the closing transistor T3 is conductive.

Assuming that during the closing period of an m+ contact member, no preselector pulse would arrive, this would indicate that the issued pulse sequence does not coincide with the adjusted code and hence the code responsive control receiver must not respond. Thus, the first flip flop stage remains in the other switching condition in which the transistor T4 is conductive, and the transistor T5 and the switching transistor T1 are turned off. When the *m*+ contact member is again open, the overlap transistor T2 is once again turned off.

Since the switching transistor T1 is then also turned off, a positive potential is connected to the base electrode of the second transistor T6 of the second flip flop stage, via a resistor R3 and a cross resistor R4, so that the transistor T6 is fully turned on. The second bistable flip flop stage is thus triggered into its other switching position wherein the first transistor T7 as well as the blocking transistor T3, which is controlled by the former, are both turned off. This interrupts the circuit of the command relay KR, so that no switching command can be executed.

The second bistable flip flop stage also assumes this other switching condition if a preselector pulse arrives during the closing period of one of the *m*− contact members connected to the control input of the first transistor T6. The code is so set up so that no preselector pulse may enter or arrive during the closing period of the *m*− contact members. If a preselector pulse does occur, this indicates that the transmitted code does not coincide with the adjusted code and that the code responsive control receiver may not execute a switching command, therefore. This is accomplished, as previously described, by turning off the blocking transistor T3.

Once the second bistable flip flop stage has been switched from its output condition wherein the transistor T7 and the transistor T3 are conductive, it will remain in this switching condition during the further rotation of the switching arm A. At the conclusion of its rotation, the switching arm A actuates the quenching contact member *ml*, which connects the control input connected to the transistor T7 to the positive potential and returns the second flip flop stage to its output condition. The flip flop stage is thus prepared for a new control process.

The pulse circuit is also connected to the positive potential during the closing period of the quenching contact member *ml* via the blocking diode D2. The positive potential reaches, via the control input of the first flip flop stage connected to the pulse circuit, the base electrode of the transistor T5. This fully turns on the transistor T5 if the latter is turned off as a result of a not-received, active preselector pulse. The first bistable flip flop stage is thus switched to its defined output condition, in any event, at the end of a control process.

The capacitor C2 with its series resistor R2 connected in parallel with the voltage divider R14, R15, functions to bridge temporary or short-period voltage decreases or dips, or voltage interruptions, which may occur during shifting or bouncing of the contact members, in order to prevent the overlap transistor T2 from turning off as a result of such voltage irregularities.

The free-wheeling diode D3, which is connected in parallel with the working coils of the command relay, keeps the negative voltage peaks away from the flip flop stages during the closing period of the ON and OFF contact members me and ma. These negative voltage peaks may occur during the switching off of the working coils. This helps to prevent an unintentional switching of the flip flop stages which would lead to the turning off of the switching transistor T1 and the blocking transistor T3.

The pulse circuit may be connected to a plurality of command relays KR which may be connected individually despite a common preselector code, provided their subordinated ON and OFF contact members are positioned at various places of the synchronous selector disc. The corresponding ON-OFF control pulses must arrive at the time that the synchronous selector disc or the switching arm coupled thereto has arrived at the pertinent respective locality and has actuated the contact member.

The code responsive control receiver of the invention offers the particular advantage that the preselector code may be expanded any time, within the scope of the switching steps available for preselection. This is done simply by connecting additional *m*+ and *m*− contact members in parallel. This also affords a subsequent expansion of the preselector code in the existing control receiver installations.

I claim:

1. A code-responsive control receiver for response to a preselectable code combination which operates on the pulse interval principle and has at least one polarized command relay, said receiver comprising a pulse circuit with pulse sequences of active and passive preselection pulses for the preselection of the code combination, a synchronous selector and switching members actuable by said selector to connect said command relay to said pulse circuit, a receiver input having a receiver relay with a normally opened circuit closer responsive to the rhythm of the arriving preselector and control pulses in combination with a direct voltage source having two poles, said pulse circuit being connected to one of said poles when said closer is closed, first and second flip flop transistor stages, said command relay having two differential working coils, said first flip flop stage being connected to said switching member to be controlled thereby and being connected through said second flip flop stage to said two differential coils of the command relay so that the system operates to selectively activate particular loads or load groups in accordance with the preselected code pulse combination.

2. A code-responsive control receiver for response to a preselectable code combination which operates on the pulse interval principle and has at least one polarized command relay, said receiver comprising a pulse circuit with pulse sequences of active and passive preselection pulses for the preselection of said code combination, a synchronous selector and switching members actuable by said selector to connect said command relay to said pulse circuit, a receiver input having a receiver relay with a normally opened circuit closer responsive to the rhythm of the arriving preselector and control pulses in combination with a direct voltage source having two poles, said pulse circuit being connected to one of said poles when said closer is closed, a first bistable flip flop stage having a first transistor whose base electrode is connected to said source, said first flip flop stage having a second transistor parallel ones of said switching members being responsive to said active preselector pulses, a diode and a capacitor serially connecting the base electrode of said second transistor with said one pole of said direct voltage source when said latter switching members are closed, a resistance member connected across said capacitor, a voltage divider connected between said latter switching members and said diode on the one hand and the other pole of said direct voltage source on the other hand, an overlapping transistor, said voltage divider having a tap connected to the base electrode of said latter transistor, a series resistor connecting the collector electrode of said latter transistor to said first pole of said source, the emitter electrode of said latter transistor being connected with said second pole, a switching transistor connected to and controllable by said first transistor and connected in parallel to said emitter electrode of said overlapping transistor, a second bistable flip flop stage comprising another first transistor, a quenching member connecting the control input of said latter transistor with said first pole of said source, said second flip flop having another second transistor connectable through parallel ones of the passive pulse related ones of said switching members with said pulse circuit, a transverse resistor connecting the base electrode of said latter second transistor with the collector electrode of said overlapping and switching transistor, said command relay having two differential working coils with a common feed lead connected to said other pole of said source, and a blocking transistor interposed in said common lead and in controlled connection with said first transistor of said second flip flop stage.

3. A control receiver according to claim 2, comprising a shunt circuit connected in parallel with said voltage divider and comprising a resistor and a capacitor in series connection with each other.

4. A control receiver according to claim 2, comprising a blocking diode connected between said pulse circuit and the control input of said second flip flop stages at a point said latter control input where said latter input is connected through said quenching contact with said first pole of said direct voltage source.

5. A control receiver according to claim 2, comprising a free-wheeling diode connected in parallel with said working coils of said command relay.

* * * * *